US005887703A

United States Patent [19]

Meyer et al.

[11] Patent Number: 5,887,703

[45] Date of Patent: Mar. 30, 1999

[54] METHOD FOR DISTRIBUTING MATERIAL OVER THE WIDTH OF A CONVEYING GRATE AND PUSH GRATE FOR CARRYING OUT THIS METHOD

[75] Inventors: Hartmut Meyer, Thomasburg; Günther Koeberer, Hamburg; Albrecht Wolter, Bremen; Egbert Steffen, Hamburg, all of Germany

[73] Assignee: BMH Claudius Peters AG, Buxtehude, Germany

[21] Appl. No.: 919,676

[22] Filed: Aug. 28, 1997

[30] Foreign Application Priority Data

Aug. 29, 1996 [DE] Germany ........................ 196 35 036.0

[51] Int. Cl.[6] ........................ B65G 37/00

[52] U.S. Cl. ........................ 198/570; 198/773

[58] Field of Search ........................ 198/570, 773

[56] References Cited

U.S. PATENT DOCUMENTS

| | | | |
|---|---|---|---|
| 3,539,164 | 11/1970 | Brachthäuser | 263/32 |
| 4,170,183 | 10/1979 | Cross | 198/773 |
| 4,592,724 | 6/1986 | Dürr et al. | 432/78 |
| 4,901,653 | 2/1990 | Baltzinger | 198/773 |
| 5,069,146 | 12/1991 | Dethier | 198/773 |
| 5,129,820 | 7/1992 | Kupper et al. | 432/77 |

FOREIGN PATENT DOCUMENTS

| | | | |
|---|---|---|---|
| 0 129 657 A2 | 1/1985 | European Pat. Off. | F27B 7/38 |
| 1.563.364 | 4/1969 | France . | |
| 1 170 307 | 5/1964 | Germany . | |
| 1 242 798 | 6/1967 | Germany . | |

*Primary Examiner*—Joseph E. Valenza
*Assistant Examiner*—Khoi H. Tran
*Attorney, Agent, or Firm*—Alix, Yale & Ristas, LLP

[57] ABSTRACT

Method for distributing material over the width of a conveying grate. In order to induce the material to flow off from a width section (6, 11) onto a second width section (7, 8), the first width section is operated at a lower speed of advance than the second (7, 8). In addition, braking or a smaller conveying length can be provided in the first width section (6, 11), as compared with the second (7, 8). The invention also relates to a push grate for carrying out the method.

14 Claims, 5 Drawing Sheets

METHOD FOR DISTRIBUTING MATERIAL OVER THE WIDTH OF A CONVEYING GRATE AND PUSH GRATE FOR CARRYING OUT THIS METHOD

For cooling combustion material, for example cement clinker, cooling grates are used, cooling air being introduced from these into the material bed lying thereon, the cooling air flowing through this bed and cooling it. The cooling effect which can be achieved over the length of the grate depends, inter alia, on the thickness and speed of advance of the material bed. In the case of conventional grates, these parameters are not constant over the grate width. This is because the material from the upstream furnace is not discarded so as to be distributed completely uniformly over the width of the grate. Most of the material to be cooled passes first onto a middle region of the grate and, by virtue of the relative movement prevailing in the material bed and caused by the advancing movement of the grate, flows off from the said middle region towards the sides which are covered to a lesser extent. However, in known grates, it is not possible thereby to achieve a complete equalization of the initially differing thickness of the material bed. This also applies to a known cooling grate (EP-A 129,657), in which the zone located in the discharge region of the rotary tubular furnace has, per unit area, more stationary and more non-ventilated grate plates than there are in the laterally adjacent zones. Although this is conducive to the material building up in the middle region and flowing off towards the side regions, nevertheless sufficient equalization of the differing thickness of the material bed cannot be achieved thereby, particularly in the case of large grate widths.

The conveying speed of the material bed is influenced by the grain size distribution in the material bed. The greater the fine fraction, the greater the tendency to flow and consequently the conveying speed of the material. In general, a higher fine fraction is encountered in the side regions of the grate than in the middle region. This is attributable, on the one hand, to the fact that, when material flows off from the initially more thickly covered middle region of the grate towards the sides, segregation occurs in favour of the proportion of coarse fractions in the middle and the proportion of finer fractions in the side regions. Also, the furnace discard is not uniform over the width of the grate. More coarse material is discarded on one side and in the middle and more fine material is discarded on the other side. Particularly in that side region which contains an even greater fine fraction than the other side region as a result of the asymmetric discard behaviour of the rotary tubular furnace, the material speed may assume undesirably high values, so that the cooling effect is no longer sufficient ("Red River").

The wider a grate is, the more difficult it is to distribute the material uniformly over its width. The problems mentioned are therefore aggravated by the recent tendency to an ever higher plant capacity. Attempts are made to fulfil this by increasing the length and speed of advance of the cooler, whilst limiting its width. In this case, however, an economic limit is reached, because the grate-plate wear increases exponentially with the speed of advance.

Similar problems arise in the case of conveying grates which are used for purposes other than for the cooling of combustion material.

The object on which the invention is based is, therefore, to provide a method for distributing material over the width of a conveying grate, on which the material bed has initially a greater thickness in a first width section than in at least one second adjacent width section. The object on which it is based is, furthermore, to provide a push grate suitable for carrying out the method according to the invention.

The solution according to the invention resides in the features of claims 1 and 4 and preferably in the features of the sub claims.

The method according to the invention is distinguished in that the material bed is built up even more in the first width section, in which it was initially already thicker, in relation to the second adjacent width section. The difference in the thickness of the material bed is accentuated thereby. The result of this, in turn, is that the material is induced to flow off laterally from the first, more thickly covered width section onto the section width section. This method is particularly suitable for push grates, because these cause a constant movement within the material and therefore the flow-off of the material from the first width section to the second can take place even when the angle of repose is not exceeded.

The material is built up in the first width section by operating the conveying grate therein at a lower conveying speed than in the second width section. In addition, the material in the first width section can be braked in places by providing suitable obstacles which inhibit the conveying movement of the material. These may be distributed to a greater or lesser extent over the entire length of these sections. Instead or in addition, there may be provision for this braking to take place mainly in the initial portion of the first width section, where, in any case, the thickness difference between this width section and the adjacent width sections is greatest due to the discard accumulation. For example, there may be provision, in the first more thickly covered width section, for no conveying drive to act on the material in this portion, whilst a conveying drive is already present in the adjacent, more thinly covered zones. Or in other words: the conveying action of the grate on the material bed commences later in the so-called first width section than in the more thinly covered, so-called second width regions adjacent to this.

When a first and at least one second width section are mentioned in this connection, it is intended to mean primarily an arrangement of three sections which are arranged next to one another and the middle one of which has the initially thicker covering, whilst the outer two are covered more thinly. However, the principle according to the invention may be applied perfectly well to any pairing of a more thickly and a more thinly covered width section. If, for example, in an arrangement of five width sections located next to one another, the middle one experiences the thickest initial covering, then this is the first width section in relation to the sections immediately adjacent to it. These, if they are covered more thickly initially or in the course of the distribution operation than the sections located completely on the outside, may, in turn, be considered as the first width sections in relation to the width sections located completely on the outside.

It is possible, admittedly, to carry out the division of the grate into a plurality of width sections over the entire or a substantial part of the grate length, so that the conveying speed in these sections can be optimally matched to the different cooling properties of the material in the various width regions. In a preferred design, however, the distribution method according to the invention, with the division of the grate into a plurality of width sections having a different conveying speed, is provided only in a relatively short grate portion which is expediently located near to or immediately downstream of the feed point and which, by virtue of its function, is referred to here as an equalizing portion. If the grate is operated at a lower speed of advance in the first width section having initially a greater thickness of the bed of material to be cooled than in at least one adjacent second width section having initially a smaller thickness of the bed of material to be cooled, then, in the first place, the thickness difference of the bed of material to be cooled is accentuated and therefore more material will flow off from the more thickly covered width section into the adjacent, more quickly conveying section having a lower material bed thickness. If this is controlled in such a way that identical mass flows thereby occur in all the sections at the end of the equalizing portion, and if these mass flows are then guided onto a following grate portion which has an equal conveying speed of the material over the entire grate width, then a material bed thickness which is constant over the entire grate width is obtained. Expediently, therefore, in the equalizing portion, the speed of advance of the adjacent width sections is regulated in dependence on the relative thickness of their bed of material to be cooled.

This does not mean that a constant material bed thickness over the entire grate width must, at all events, be the aim of this regulating operation. On the contrary, in determining the material bed thickness to be achieved, further considerations may also play a part, such as, in particular, the grain size distribution. Thus, for example, it may be expedient to keep the material bed thickness a little smaller in the side regions than in the middle region, in order, when the cooling-air pressure is uniform over the grate width, to take into account the higher air passage resistance in the regions having a smaller average grain size. By contrast, if the side regions are subjected to a higher cooling-air pressure than the middle region, it may be expedient to operate the side regions with a somewhat greater material bed thickness than in the middle region, because the smaller grain size in the side regions affords better preconditions for heat transmission. However the distribution of the material bed thickness in the main part of the cooler is to be organized, the invention provides a suitable means for this purpose.

The push grate suitable for carrying out the method has, in the equalizing portion, a plurality of width sections arranged next to one another and possessing separate drive means for speeds of advance differing from one another, the said speeds of advance being higher or capable of being set higher in the second width section (or second width sections) than in the first. By the speed of advance is to be meant, in this case, the speed of movement of the grate members generating the conveying movement of the material. It must be distinguished from the conveying speed of the material bed. By separate advancing means are therefore to be meant those which make it possible for the speed of advance of the width sections to be set differently and preferably independently of one another.

In addition, the more thickly covered first width section may contain, as an obstacle to conveyance, an additional number of unmoved grate plates which, for example, may also be provided as so-called bridging plates in the region of the rows of moved grate plates. The unmoved grate plates are expediently distributed over that length of the first width section in which a buildup effect is desired.

An accumulated arrangement of unmoved plates may be provided at the start of the more thickly covered first width section. It is customary, in any case, in the initial region of a push grate in which the hot material discarded by the furnace impinges, to provide only unmoved plates which are covered by a pile of material protecting them from the direct impingement of the hottest material. Such rows of unmoved grate plates may be provided at the start in all the width sections. However, a greater number or total length of such rows of unmoved grate plates is provided in the more thickly covered first width section, whilst a smaller number or total length of the rows of unmoved grate plates is provided in the adjacent, more thinly covered second width sections and the rows of moved grate plates commence earlier.

Expediently, the speed of advance of each of the adjacent sections can be set or regulated independently of those of the others; however, it may also be sufficient if only their ratio to one another can be varied. For this purpose, it may be sufficient if, for example in the case of an arrangement with three width sections arranged next to one another, only the speed of advance in the middle region or the speeds of advance in the side regions can be varied. The speeds of advance in the equalizing portion are expediently regulated in dependence on the material bed height in the individual portions. Instead, the material bed height in the width regions of the following cooler portion which correspond to the width sections may also be used.

The length of the equalizing portion may be small in comparison with the total length of the grate. It is dimensioned in such a way that the desired equalization can be achieved. There is normally no need for a length larger than double the grate width. As a rule, a length which is smaller than one grate width is sufficient. By the length of the equalizing portion is to be meant, in this case, that length of the longest width section of the equalizing portion which can be operated at a speed of advance differing from that of the following grate portion.

The lateral equalization of the material bed in the equalizing portion may be assisted by giving the equalizing portion a higher inclination in the conveying direction than the following grate portion. The inclination of the equalizing portion is preferably of the order of magnitude of 8°–15°, whilst the inclination in the following portion is merely of the order of magnitude of 1°–7°, preferably 3°–5°. Towards the end of the cooler, the inclination may be around 0°.

The width of the sections is dimensioned according to the distribution of the material bed thickness directly downstream of the feed region. If three sections are provided, the width sections located laterally of the middle section have expediently half the width to the full width of the middle section.

Since the equalizing portion is located in the hot region of the cooler and the differences in the covering of the grate are temporarily accentuated in this region by virtue of the invention, it is expedient to match the ventilation to the conditions in the different regions of advance and consequently also make the separately drivable sections capable of being ventilated separately.

The invention is explained in more detail below with reference to the drawing which illustrates an advantageous exemplary embodiment and in which.

Figure 1:
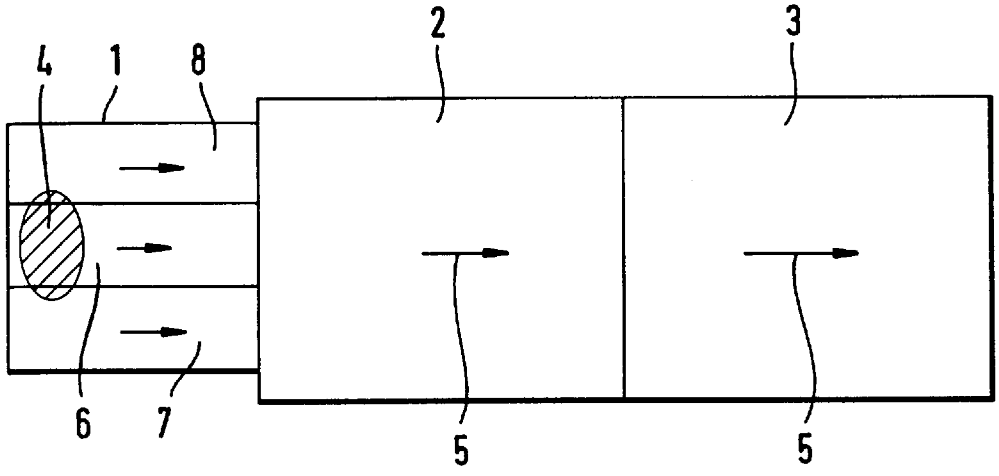
FIG. 1 shows a diagrammatic top view of a cooling grate.

The cooling grate of a clinker cooler, the said grate being illustrated in FIG. 1, consists of three portions, namely the entry region 1 and two downstream portions 2 and 3. The material to be cooled falls out of the preceding rotary tubular furnace, mainly in the region 4 hatched in FIG. 1, onto the cooler and is then distributed over the width of the latter.

In the portions 2 and 3 which form the main part of the cooler, the latter is of conventional design, in particular consisting of alternating transverse rows of stationary grate plates and of grate plates moved forwards and backwards in the conveying direction 5. The portion 2 is slightly inclined by 3° in the conveying direction. The portion 3 runs horizontally. In the portions 2 and 3, the speed of advance of the grate plates is constant over the width. The material bed lying on them may have different conveying speeds in its width regions of different types.

The end region 1 is likewise composed of transversely running rows of grate plates. Outside the stationary regions explained later, it is composed of three width sections, namely of a middle section 6 and of the side sections 7 and 8 which are likewise formed in each case from transverse rows of grate plates which alternately are stationary and are driven so as to move forwards and backwards in the conveying direction indicated by arrows. It goes without saying that a different number of width sections may also be selected, for example two, four of five.

Figure 2:
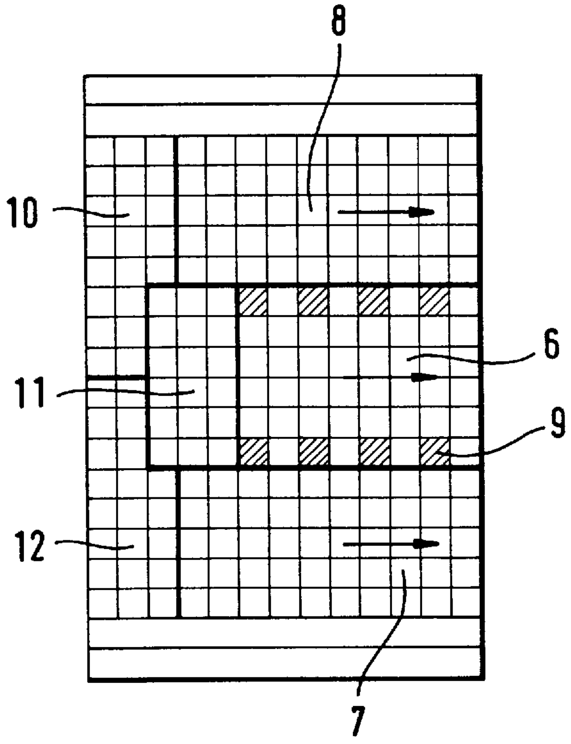
FIG. 2 shows an enlarged illustration of the equalizing portion.

The design of the entry region 1 emerges in more detail from FIG. 2. In this, individual grate-plate areas are contrasted from other areas by a thick borderline. Only stationary grate plates are provided in the areas 10, 11, 12. A pile of material to be cooled settles on these and protects the grate against overheating and wear caused by the material directly impinging on them from the furnace.

The areas 6, 7 and 8 consist alternately of stationary rows of grate plates and of rows of grate plates moved forwards and backwards, in each case the first row of grate plates which follows the areas 10–12 being one which is moved. They are driven independently of the grate plates of the other area in each case and of the following portion 2. In the example illustrated, the middle section 6 has the width of six grate plates, whilst the outer sections 7 and 8 comprise in each case five grate-plate widths. The sections 7 and 8 are ten grate plates long. The length thereby determined for the equalizing portion amounts to a good half of the width of each of the three sections. Some stationary bridging plates 9, indicated by hatching, are provided in the middle section 6, so as to be distributed over the length, instead of plates in moved rows of grate plates.

FIGS. 3 to 6 illustrate the design by way of example. The stationary rows of grate plates rest on transversely running grate-plate girders 14 which themselves rest on edge girders 15 and longitudinal spars 16. The grate-plate girders 14 are designed as air guide ducts to the grate plates connected in an air-guiding manner to them. The said girders are divided into girder portions 14*a*, 14*b*, 14*c* separated in terms of ventilation from one another, so that the grate-plate groups assigned to them can be supplied with air independently of one another. The longitudinal spars 16 and, if appropriate, the edge girders 15 are also designed as air guide ducts for supplying the grate-plate girder portions. The longitudinal spars 16 are divided in terms of ventilation into halves 16*a* and 16*b* which are assigned in each case to adjacent portions 14*a*, 14*b*, and 14*c* of the grate-plate girders. According to FIG. 5, the middle portions 14*b* of the stationary grate-plate girders are supplied with cooling air from a duct 13 via branches and via the longitudinal-spar halves 16*a* assigned to them. The outer grate-girder portions 14*a* and 14*c* are correspondingly supplied with cooling air from cooling-air ducts 17 and 18 via the longitudinal-spar halves 16*b* assigned to them and via the edge girders 15.

The movable grate plates rest on grate-girder portions 20*a*, 20*b*, 20*c*, which are separated mechanically from one another and which are in each case carried, via brackets 21, by longitudinal spars 22*a*, 22*b* and 22*c* which themselves rest in a known way on bearings 23 so as to be longitudinally moveable and which can be pushed forwards and backwards in the longitudinal direction of the plates by means of hydraulic drives 24. The advancing movement is generated thereby.

The grate-plate girders 20*a*, 20*b* and 20*c*, the brackets 21 and the longitudinal spars 22 are designed so as to guide cooling air for the purpose of supplying cooling air to the grate-plate groups assigned to them. The longitudinal spar 22*b* of the moveable rows of grate plates of the middle section 6 are supplied with cooling air (see FIG. 5) from the cooling-air duct 13 via branches 26 having some movement tolerance. The same takes place accordingly for the longitudinal spars 22*a* and 22*c* of the lateral sections 7 and 8 from the cooling-air ducts 17, 18 (see FIG. 6) via duct branches 27, 28 having some movement tolerance. The stationary and moveable grate plates of the middle section 6 are thus supplied from one and the same cooling-air source. The same applies accordingly to the grate plates of the sections 7 and 8. The supply of air to these sections and their frequency of movement may be set independently of those of the other sections.

Figure 3:
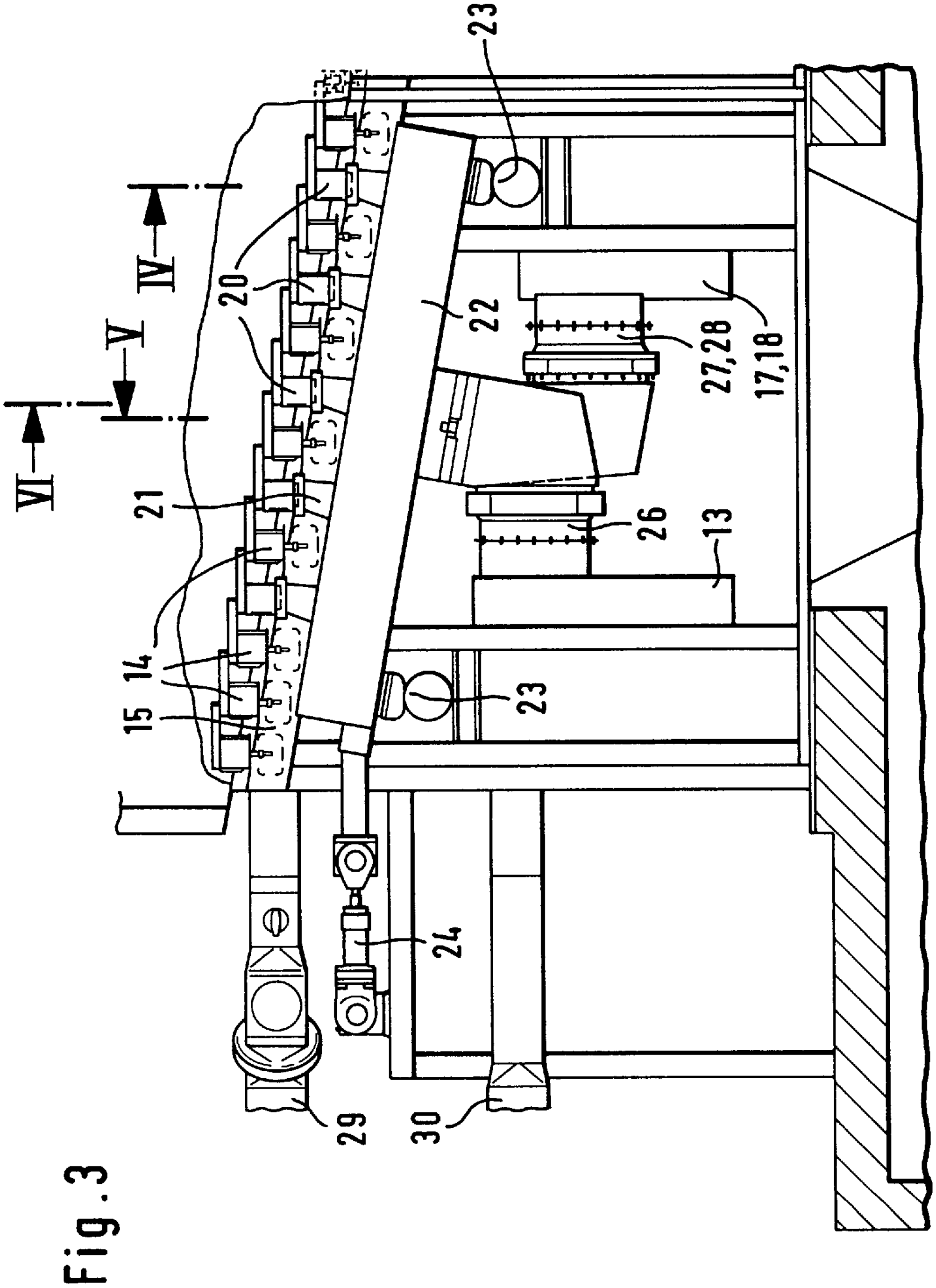
FIG. 3 shows a diagrammatic longitudinal section through the equalizing portion.
Figure 4:
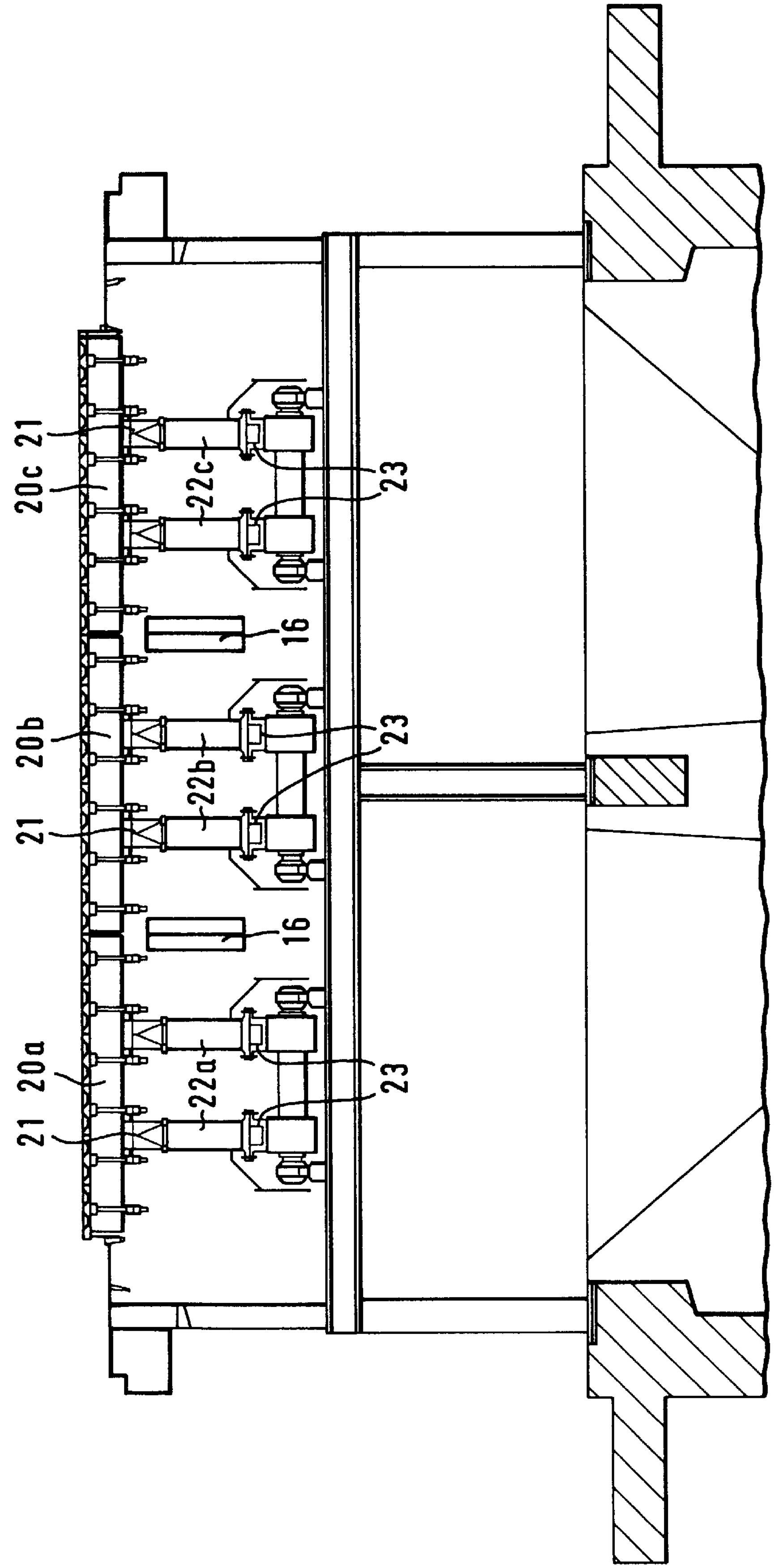
FIG. 4 shows a cross-section in the plane IV of FIG. 3.
Figure 5:
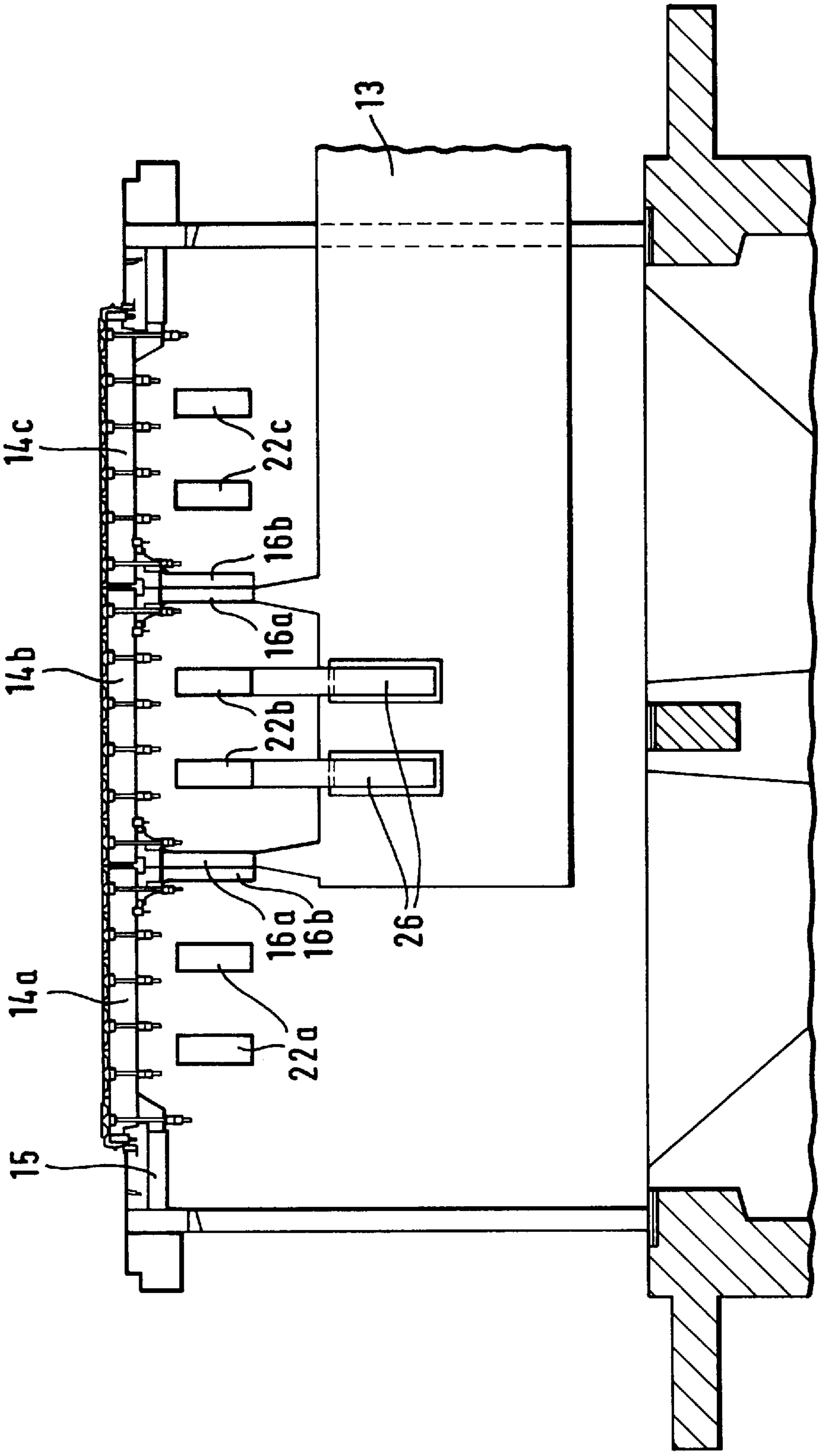
FIG. 5 shows a section in the plane V of FIG. 3.
Figure 6:
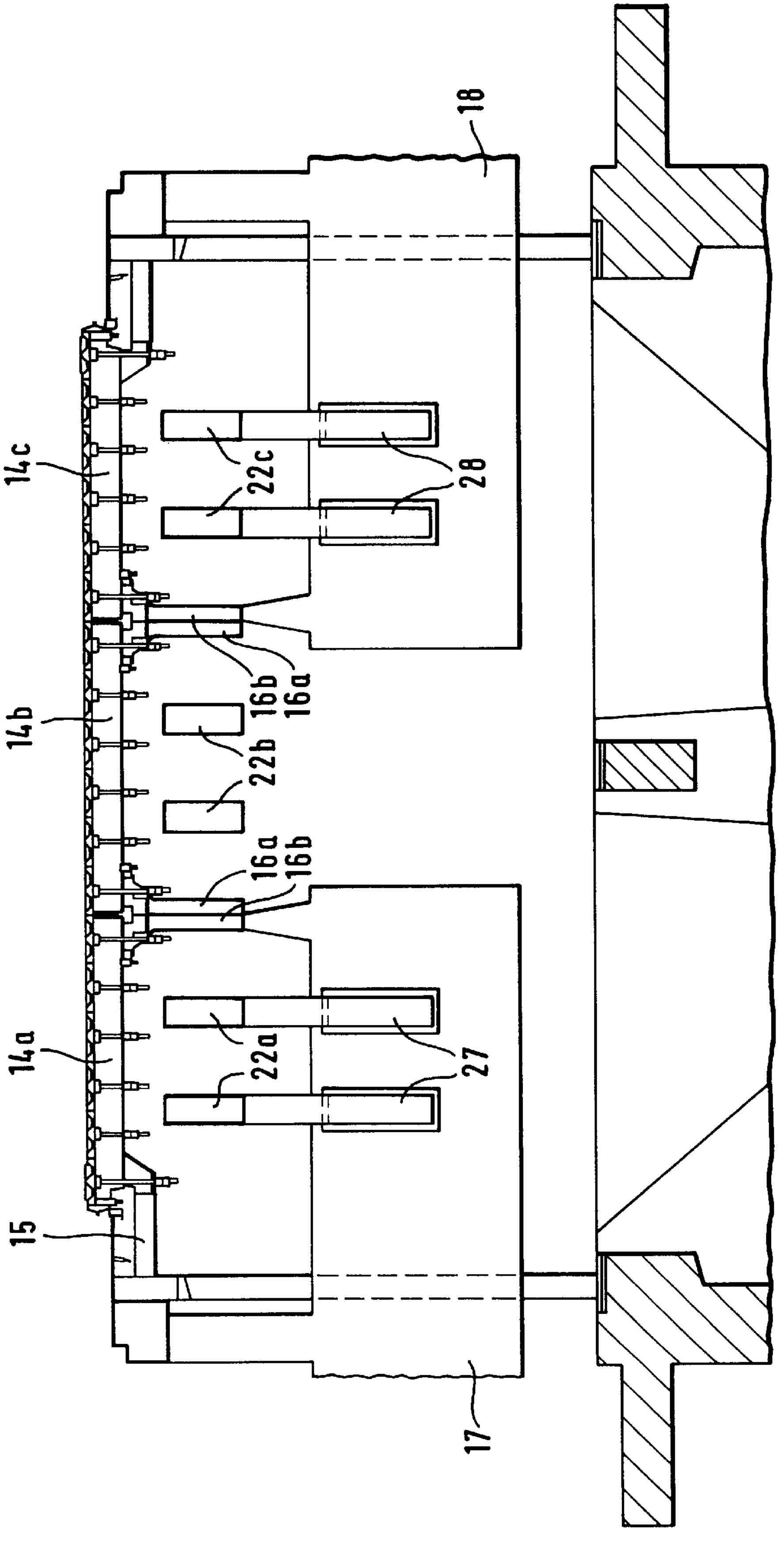
FIG. 6 shows a section in the plane VI of FIG. 3.

A separate cooling-air supply, capable of being set differently from the remaining areas, is also provided to the areas 10, 11 and 12, and, in fact, FIG. 3 shows cooling-air ducts 29, 30 which are assigned to these areas. Other cooling-air supply devices again are provided for the cooler portions 2 and 3 and, if desired, for individual areas within these portions. To avoid too large a number of parameters to be regulated, it may be expedient to keep the supply of cooling air to the individual areas constant, after it has once been suitably set, and to regulate only their speed of advance.

The inclination of the grate portion shown in FIG. 3 in a conveying direction is 10°. That configuration of the equalizing portion which is specified in this example makes it possible to increase the cooler width for a given cooler capacity by about 25%. This means that the pushing frequency in the cooler portions 2 and 3 can be reduced by about 25%. In the equalizing portion, on account of the synergism between the equalization of the material bed thickness, on the one hand, and the inclination which is higher, as compared with conventional coolers, the cooler frequency may be reduced to an even greater extent, namely of the order of magnitude of 20 $min^{-1}$ to below 10 $min^{-1}$. A typical example has a pushing frequency of 5 $min^{-1}$ in the middle section of the entry portion and a pushing frequency of 7–8 $min^{-1}$ in the side sections. The plate wear is thereby greatly reduced in all the portions.

There are three particular features of the design described which induce or reinforce the transverse transport according to the invention from the middle first section (areas 6 and 11) onto the so-called second sections 7 and 8. Firstly, the moved rows of grate plates of the area 6 have a lower speed of advance than those in the sections 7 and 8. Secondly, the bridging plates 9 in the area 6 brake the conveying speed of the material there, and, thirdly, only stationary plates are located in the area 11, whilst an advancing movement is already taking place laterally of this in the sections 7 and 8. The result of these particular features is that the bed thickness in the middle section, which in any case is already greater, is further increased and, as a result, the transverse transport of the material towards the lateral sections is reinforced and consequently the mass flow becomes more uniform. When the material streams in the three sections subsequently meet at the speed of advance of the portion 2 of the cooling grate, the said speed of advance being constant over the width, an essentially equal bed thickness is obtained. If an unequal bed thickness over the width is desired in the portions 2 and 3 for any reason, this can likewise be set by the means according to the invention.

We claim:

1. Method for distributing material over the width of a conveying grate, on which the material bed has initially a greater thickness in a first width section than in at least one adjacent second width section, characterized in that, at least in an initial portion (equalizing portion) of the grate length, the conveying grate is operated at a lower speed of advance in the first width section than in the second.

2. Method according to claim 1, characterized in that, in the first width section, the material is braked in places.

3. Method according to claim 1, characterized in that, downstream of the equalizing portion, the grate is operated at a conveying speed which is essentially constant over the width.

4. Push grate for a combustion-material cooler with a series of rows of grate plates which run transversely relative to the conveying direction of the grate and which are alternately unmoved and moved to and fro in the conveying direction, the said push grate having, at least in an initial portion (equalizing portion (6, 7, 8, 11)), means which give the material bed a lower conveying speed in a first width section (6, 11) than in at least one adjacent second width section (7, 8), characterized in that the second width section (7, 8) has drive means, separate from the first width section (6, 11), for a higher speed of advance of its grate plates, as compared with those of the first width section (6).

5. Push grate according to claim 4, characterized in that it contains more unmoved grate plates (9) in the first width section (6, 11), as compared with the second width section (7, 8).

6. Push grate according to claim 4, characterized in that at least some of the unmoved grate plates (area 11) are provided in an accumulated manner at the start of the first width section (6, 11).

7. Grate according to claim 4 characterized in that the equalizing portion is arranged near to or immediately downstream of the feed point (4).

8. Grate according to claim 4 characterized in that three width sections (6, 7, 8, 11) are arranged next to one another, of which the middle one forms the first width section (6, 11) and the outer ones form in each case a second width section (7, 8).

9. Grate according to claim 4, characterized in that the equalizing portion (6, 7, 8, 11) is followed by a grate portion (2) having essentially constant speed of advance over the entire grate width.

10. Grate according to claim 9, characterized in that the length of the longest width section (7, 8) of the equalizing portion which can be operated at a speed of advance differing from that of the following grate portion (2) is no larger than double the grate width in this portion.

11. Grate according to claim 4, characterized in that the grate exhibits an inclination in the conveying direction that is higher in the equalizing portion than in the following portion (2).

12. Grate according to claim 4, characterized in that a width section (7, 8) located next to a middle width section (6, 11) has half the width to the full width of the middle width section (6).

13. Grate according to claim 4 characterized in that adjacent width sections (6, 7, 8, 11) can be ventilated separately at a different speed of advance.

14. Grate according to claim 4, characterized in that the difference in the speed of advance between adjacent width sections (6, 7, 8, 11) of the equalizing portion can be regulated in dependence on the material bed height.

* * * * *